United States Patent
Minsky

(10) Patent No.: US 9,883,571 B2
(45) Date of Patent: Jan. 30, 2018

(54) SYSTEMS AND METHODS OF CONTROLLING LIGHT SOURCES ACCORDING TO LOCATION

(71) Applicant: Google Inc., Mountain View, CA (US)

(72) Inventor: Henry Bowdoin Minsky, Newton, MA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/294,334

(22) Filed: Oct. 14, 2016

(65) Prior Publication Data
US 2017/0034896 A1    Feb. 2, 2017

Related U.S. Application Data

(63) Continuation of application No. 14/585,264, filed on Dec. 30, 2014, now Pat. No. 9,526,155.

(51) Int. Cl.
*H05B 37/02* (2006.01)
*H04L 12/28* (2006.01)
*H05B 33/08* (2006.01)

(52) U.S. Cl.
CPC ..... *H05B 37/0281* (2013.01); *H04L 12/2816* (2013.01); *H05B 33/0845* (2013.01); *H05B 33/0863* (2013.01); *H05B 37/0209* (2013.01); *H05B 37/029* (2013.01); *H05B 37/0218* (2013.01); *H05B 37/0227* (2013.01); *H05B 37/0245* (2013.01); *Y02B 20/42* (2013.01)

(58) Field of Classification Search
CPC ............ H05B 33/0842; H05B 37/0227; H05B 37/0281; H05B 37/029

USPC ......................................................... 315/291
See application file for complete search history.

(56) References Cited

U.S. PATENT DOCUMENTS

| | | | |
|---|---|---|---|
| 5,059,871 A | 10/1991 | Pearlman et al. | |
| 8,686,647 B2 | 4/2014 | Ono et al. | |
| 8,729,824 B2 | 5/2014 | Smith | |
| 9,182,164 B1* | 11/2015 | Henderson, Jr. | ........ F24F 1/025 |
| 9,491,571 B2* | 11/2016 | Karp | |
| 2005/0134191 A1 | 6/2005 | Wong et al. | |

(Continued)

FOREIGN PATENT DOCUMENTS

| | | |
|---|---|---|
| CN | 2615785 Y | 5/2004 |
| WO | WO-2010095087 A1 | 8/2010 |

(Continued)

OTHER PUBLICATIONS https://nest.com/support/article/Getting-started-using-the-Nest-Learning-Thermostat, Jun. 22, 2017.*

(Continued)

*Primary Examiner* — Don Le
(74) *Attorney, Agent, or Firm* — Morris & Kamlay LLP

(57) ABSTRACT

Systems and methods of the disclosed subject matter provide a first light source, a second light source, and a controller communicatively coupled to the first light source and the second light source, the controller to control a first operation of the first light source according to an input received by the controller for at first period of time, and to control a second operation of the second light source when the input received by the controller is for a second period of time that is greater than the first period of time.

40 Claims, 7 Drawing Sheets

(56) References Cited

U.S. PATENT DOCUMENTS

| | | | |
|---|---|---|---|
| 2006/0119287 A1* | 6/2006 | Campbell | H05B 37/029 |
| | | | 315/291 |
| 2008/0258633 A1 | 10/2008 | Voysey | |
| 2008/0297068 A1 | 12/2008 | Koren et al. | |
| 2010/0060491 A1* | 3/2010 | Kim | F24F 11/0086 |
| | | | 341/23 |
| 2010/0128489 A1 | 5/2010 | Holder et al. | |
| 2010/0244740 A1 | 9/2010 | Alpert et al. | |
| 2011/0010283 A1 | 1/2011 | Williams | |
| 2011/0012532 A1* | 1/2011 | Barnett | E05D 11/0081 |
| | | | 315/294 |
| 2011/0022128 A1* | 1/2011 | Nakagawa | A61N 5/0617 |
| | | | 607/88 |
| 2011/0095687 A1* | 4/2011 | Jonsson | F21V 23/04 |
| | | | 315/51 |
| 2012/0075848 A1* | 3/2012 | Yamada | A01G 7/045 |
| | | | 362/231 |
| 2012/0139446 A1* | 6/2012 | Koren | H05B 33/0842 |
| | | | 315/297 |
| 2012/0146765 A1 | 6/2012 | Koppelaar et al. | |
| 2012/0242247 A1 | 9/2012 | Hartmann et al. | |
| 2013/0030589 A1 | 1/2013 | Pessina et al. | |
| 2013/0076262 A1* | 3/2013 | Noguchi | H05B 33/086 |
| | | | 315/297 |
| 2013/0088175 A1* | 4/2013 | Nishikawa | H05B 33/0806 |
| | | | 315/362 |
| 2013/0249405 A1 | 9/2013 | Cahalane et al. | |
| 2013/0293144 A1 | 11/2013 | Tomiyama et al. | |
| 2013/0293156 A1 | 11/2013 | Wells | |
| 2013/0329439 A1* | 12/2013 | Hellkamp | F21V 23/003 |
| | | | 362/464 |
| 2014/0084788 A1* | 3/2014 | Kim | B60Q 1/143 |
| | | | 315/79 |
| 2014/0187880 A1* | 7/2014 | Hsieh | A61B 5/14552 |
| | | | 600/323 |
| 2014/0217927 A1 | 8/2014 | Quinn | |
| 2014/0265897 A1 | 9/2014 | Taipale et al. | |
| 2014/0312777 A1* | 10/2014 | Shearer | H05B 33/0869 |
| | | | 315/151 |
| 2015/0163867 A1 | 6/2015 | Recker et al. | |
| 2015/0174361 A1* | 6/2015 | Baaijens | A61N 5/0618 |
| | | | 315/131 |
| 2015/0373815 A1 | 12/2015 | Patton | |
| 2015/0382436 A1* | 12/2015 | Kelly | G08C 17/02 |
| | | | 315/131 |
| 2016/0302276 A1* | 10/2016 | Fushimi | H05B 33/0848 |
| 2016/0330810 A1* | 11/2016 | Hamilton | H05B 33/0842 |

FOREIGN PATENT DOCUMENTS

| | | |
|---|---|---|
| WO | WO 2010116283 A2 | 10/2010 |
| WO | WO-2011010283 A1 | 1/2011 |
| WO | WO-2011036595 A1 | 3/2011 |
| WO | WO-2011048214 A1 | 4/2011 |

OTHER PUBLICATIONS

International Search Report and the Written Opinion for PCT Application PCT/US2015/066007 dated Mar. 2, 2016.
IPRP dated Jul. 13, 2017 as received in Application No. PCT/US2015/066007.

* cited by examiner

FIG. 7
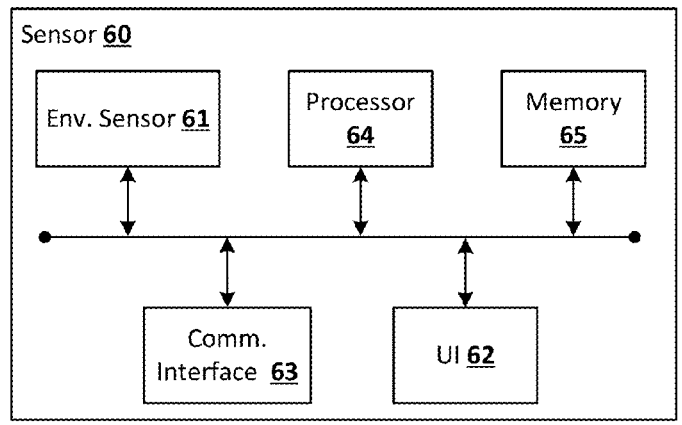
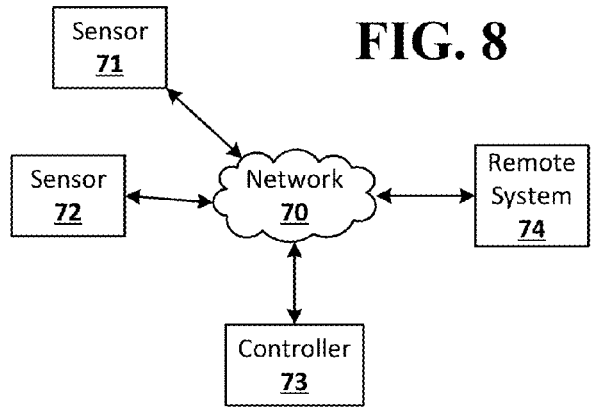
FIG. 8
FIG. 9
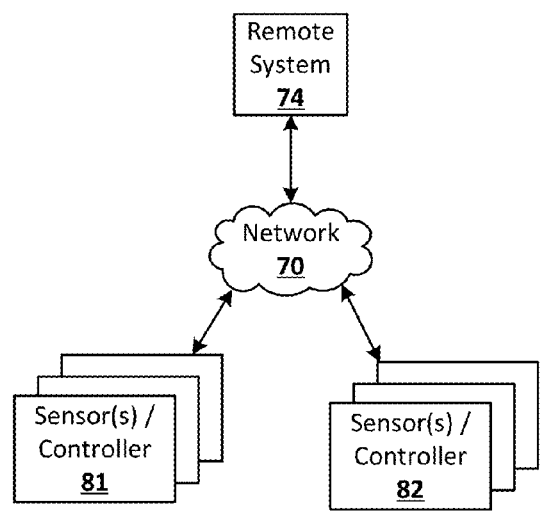

SYSTEMS AND METHODS OF CONTROLLING LIGHT SOURCES ACCORDING TO LOCATION

BACKGROUND

Current smart light sources in homes or buildings, such as smart lamps and smart lights, can be remotely switched on and off. However, with such current smart light sources, it is often difficult to provide a simple, easy-to-understand controller to control selected light sources.

Although the cost of remote-controlled light sources, such as lamps, is dropping, the complexity of figuring out how to control them has remained the same.

Typical controls for smart light source systems require a dedicated controller device, such as a keypad or wired controller. For many users, it is not obvious which button on a typical smart light source control keypad will turn on which light in a room, house, or building.

BRIEF SUMMARY

According to an embodiment of the disclosed subject matter, a system is provided that includes a first light source, a second light source, and a controller communicatively coupled to the first light source and the second light source, the controller to control a first operation of the first light source according to an input received by the controller for a first period of time, and to control a second operation of the second light source when the input received by the controller is for a second period of time that is greater than a first period of time.

According to an embodiment of the disclosed subject matter, a method is provided that includes controlling, by a controller, a first operation of a first light source according to an input received by the controller for a first period of time, and controlling, by the controller, a second operation of a second light source when the input received by the controller is for at second period of time that is greater that a first period of time.

According to an embodiment of the disclosed subject matter, a system is provided that includes a first light source, a second light source, and a controller communicatively coupled to the first light source and the second light source, the controller to control a first operation of the first light source according to a first input received by the controller, and to control a second operation of the second light source when a second input is received by the controller.

According to an embodiment of the disclosed subject matter, means for controlling light sources are provided, including controlling, by a controller, a first operation of a first light source according to an input received by the controller for a first period of time, and controlling, by the controller, a second operation of a second light source when the input received by the controller is for a second period of time that is greater than a first period of time.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 7 shows an example sensor system according to an embodiment of the disclosed subject matter.

FIG. 8 shows a system according to an embodiment of the disclosed subject matter.

FIG. 9 shows a system according to an embodiment of the disclosed subject matter.

DETAILED DESCRIPTION

Embodiments of the disclosed subject matter provide smart light source systems and controllers which provide a simple, easy-to-understand controls to select and operate light sources in a room. Light sources may be controlled, for example, so as to illuminate or turn off the light sources in a progressively larger radius and/or a progressively greater distance from the user and the light source controller. Embodiments of the disclosed subject matter may provide controls integrated with a light source, so that by operating the controls on any light source that a user happens to be near, the user may control the light source having the control, as well as other light sources within a room, area, home, and/or building.

Figure 1:
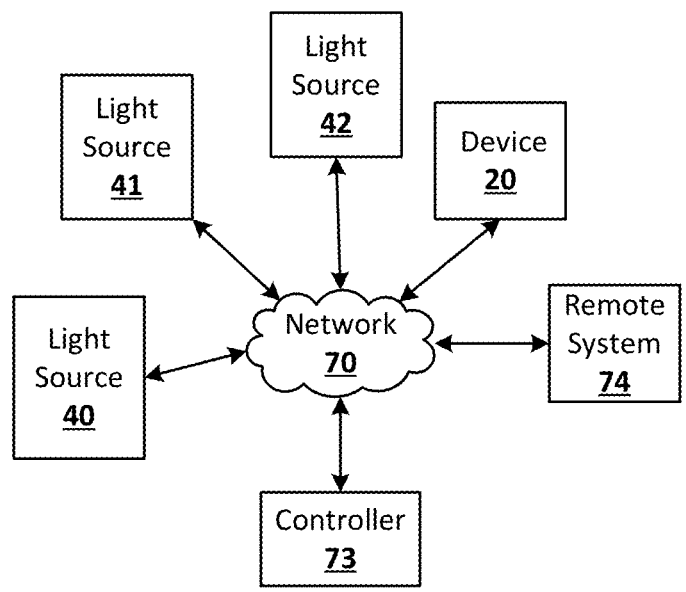
FIG. 1 shows a light source system according to an embodiment of the disclosed subject matter.

FIG. 1 shows a light source system according to an embodiment of the disclosed subject matter. The light sources 40, 41, 42 may be communicatively coupled to a controller 73 via a communications network 70. That is, the light sources 40, 41, 42 may communicate via the local network 70, which may be a Wi-Fi or other suitable network, with each other and/or with the controller 73.

The devices of the light source system of a smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, ABS (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The controller 73 of FIG. 1, as discussed in detail below, may be a switch, and/or a general- or special-purpose computer. The controller 73 may, for example, transmit operation commands to turn ON, turn OFF, control dimming (e.g., reduce the brightness), and/or increase brightness of the light sources 40, 41, 42. The controller 73 may transmit one or more request messages via the network 70 to one or more of the light sources 40, 41, 42 to determine their location relative to one another. The light sources 40, 41, 42 may transmit messages in response to the request messages to the controller 73 so that the controller may identify their positions, respectively. Alternatively, or in addition, the light sources 40, 41, 42 may communicate distance information with the controller 73 via a radio frequency and/or sonic signal.

As discussed below in connection with FIGS. 7-9, the light source system of FIG. 1 may be part of a smart-home environment. The controller 73 may include a smart switch (e.g., switch 84 that may store a network address of light sources 40, 41, 42 (e.g., the network addresses on network 70 of the light sources 40, 41, 42, which may be smart bulbs and/or smart lamps having network addresses that the controller can send commands to so as to control the light sources 40, 41, 42). When light sources 40, 41, 42 are added to the network 70, the controller 73 may receive a network address, identifying information, and/or device description data from the light sources 40, 41, 42 so that the controller 73 may communicate with and/or control the light sources 40, 41, 42 via the network 70. The controller 73 may store the network address, identifying information, and/or device description data in a memory (e.g., memory 82 shown in FIG. 2 and described below). Alternatively, or in addition, the device 20 and/or the remote system 74 may store the network address, identifying information, and/or device description data to communicate with and/or control the light sources 40, 41, 42. Alternatively, or in addition, the controller 73, the device 20, and/or the remote system 74 may periodically broadcast messages on the network 70 to determine whether one or more devices have been added to the network. The light sources 40, 41, 42, which may be newly added to the network 70, may respond to the broadcast request message with a network address, identifying information, and/or device description data that may be stored by the controller 73, the device 20, and/or the remote system 74.

In embodiments of the disclosed subject matter, when the controller 73, the device 20, and/or the remote system 74 determines that the light sources 40, 41, 42 are part of network 70 and the smart-home environment, the controller 73, the device 20, and/or the remote system 74 may determine the position and/or location of the light sources 40, 41, 42. For example, the controller 73 and/or the device 20 may determine the position of the light sources 40, 41, 42 from at least one network address, identifying information, and/or device description data received from the light sources 40, 41, 42. In another example, the controller 73 and/or the device 20 may determine the position of the light sources 40, 41, 42, according to a radio frequency (RF) and/or sound signal transmitted to the light sources 40, 41, 42. The travel time of the RF signal and/or sound signal to the light source 40, 41, 42 may be measured by the controller 73 and/or the device 20, and may be used to determine the position and/or distance of the light sources 40, 41, 42 to the controller 73 and/or device 20. The position and/or distance information may be stored by the controller 73 and/or device 20, and may be transmitted to the light sources 40, 41, 42 via the network 70 to be stored by the light sources 40 41, 42 so that they may know their position relative to the controller 73 and/or device 20, as well as to each other.

Alternatively, or in addition, a user interface of the controller 73 (e.g., UI 84 of FIG. 2) may receive input from a user regarding the positions of the light sources 40, 41, 42. For example, an application stored in memory (e.g., memory 82) and executed by a processor (e.g., processor 81) may present a display on a user interface to receive selections of the positions of the light sources 40, 41, 42. When the positions are set and/or stored according to the user input, the light sources 40, 41, 42 may be controlled accordingly, as disclosed herein. As discussed below in connection with FIG. 3, the device 20 may similarly receive selection of the locations and/or positions of the light sources 40, 41, 42 from a user input 26 and/or display 22 (e.g., a touch screen), which may be stored in memory (e.g., fixed storage 23, removable media 25, and/or memory 27 shown in FIG. 3). The device 20 may control the light sources 40, 41, 42 according to the received location and/or position information.

The light sources 40, 41, 42 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, the light sources 40, 41, 42 may communicate directly with a remote system 74 via the network 70. The remote system 74 may, for example, aggregate data from multiple locations, provide instruction, software updates, and/or aggregated data to the controller 73 and/or light sources 40, 41, 42. Alternatively or in addition, the light sources 40, 41, 42 may communicate via the network 70 with device 20, and/or may be controlled by the device 20, as discussed in detail below in connection with FIG. 3. Although three light sources 40, 41, 42 are shown in FIG. 1, this is merely an example, and one or more light sources may be included in the light source system of the disclosed subject matter.

The controller 73 may be separate from light sources 40, 41, 42, or may be integrated with one or more of the light sources 40, 41, 42. For example, the controller 73 may be part of a lamp, which is one of the light sources 40, 41, or 42. When the controller 73 is integrated with a light source (e.g., light source 40), the controller 73 may control the light source that it is integrated with, and may control other identified light sources (e.g., light sources 41, 42). For example, as in embodiments of the disclosed subject matter, the light sources 41, 42 may be controlled from the in a progressively larger radius and/or a progressively greater distance from the user and the light source controller integrated with light source 40.

Figure 2:
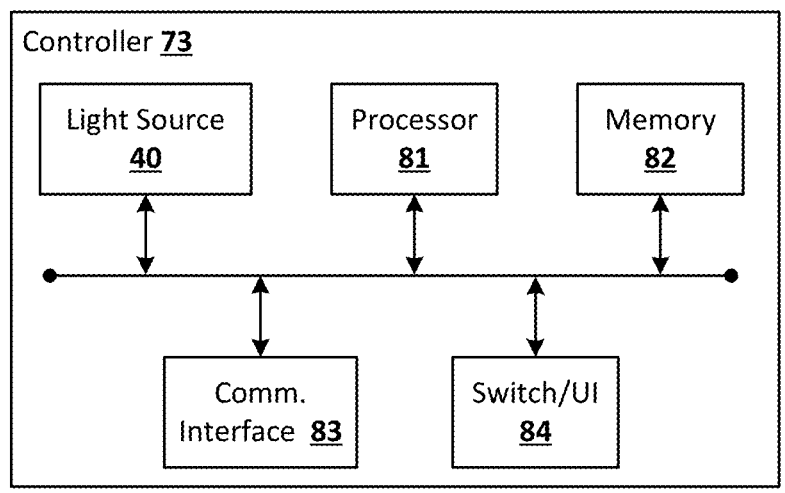
FIG. 2 shows a controller of the light source system according to an embodiment of the disclosed subject matter.

FIG. 2 shows the controller 73 of the light source system according to an embodiment of the disclosed subject matter. As discussed above, the controller 73 may include and/or may be integrated with a light source, such as light source 40. That is, a light source may be optionally integrated with the controller 73. As shown in FIG. 2, the controller 73 may include processor 81 may control the operation of one or more of the light sources 40, 41, 42. For example, the processor may control an ON operation, and OFF operation, a dimming operation, and/or a brightness operation. As used in the present disclosure, the dimming operation may reduce the power provided to the light sources 40, 41, 42 so as to reduce the optical power output by the light sources 40, 41, 42. The power provided by the dimming operation may be within a range so as to be greater than that in an OFF state, but less than the full power received during an ON operation. The brightness operation may be similar to the dimming operation, but may increase the power provided to the light sources 40, 41, 42 so as to increase the optical power output by the light sources 40, 41, 42. Alternatively, the dimming operations and brightness operations may be referred to as dimming operations, which include varying the power provided to the light sources 40, 41, 42 so as to change the optical power output by the light sources 40, 41, 42.

The processor 81 may control operation of other components of the controller 73 (e.g., memory 82, communications interface 83, user interface and/or switch 84, and the like), and process communication between the controller 73 and other devices (e.g., device 20, light sources 40, 41, 42, and/or remote system 74, and the like). The processor 81 may execute instructions stored on a computer-readable memory 82. The memory 82 or another memory in the controller 73 may also store distance and/or position data obtained from the light sources 40, 41, 42. A communication interface 83, such as a Wi-Fi or other wireless interface, Ethernet or other local network interface, or the like may allow for communication by the controller 73 with other devices (e.g., via the network 70).

A user interface (UI) 84 may provide information and/or receive input from a user of the controller 73. The input received via the UI 84 may be used to control the operation of the light sources 40, 41, 42. For example, the UI 84 may receive input to turn ON, turn OFF, control a dimming operation, and/or increase the brightness of one or more of the light sources 40, 41, 42. The UI 84 may include, for example, a switch, such as shown in FIGS. 4A-4E and discussed below. The switch may be, for example, a rocker switch, a push-button switch, a slider switch, a dial switch, or the like. The user interface 84 may be relatively minimal, such as a liquid crystal display (LCD), light-emitting diode (LED) display, or limited-output display, or it may be a full-featured interface such as a touchscreen.

As discussed in detail below, the controller 73, whether integrated with a light source, such as a lamp, and/or separate from the light sources 40, 41, 42, may receive input via the UI 84 to progressively turn ON or OFF the light sources in order of distance from the controller 73 that the user is operating. For example, the controller 73 may be a switch on a lamp, and when the user holds the switch for a longer period of time (e.g., a second period of time that is greater than a first period of time) and/or continues to turn the switch further (e.g., so as to be turned for a longer period of time), the controller 73 progressively turns on or off other lights in the room, in order of distance from the controller that the user is operating. That is, the user may receive feedback from the system as the switch is held for a longer period of time or the user continues to turn the switch further (e.g., for a longer period of time), as the light sources 40, 41, 42 progressively turn ON or turn OFF in order of distance from the controller 73 that the user is operating.

In embodiments of the disclosed subject matter, the UI 84 of controller 73 may display selections (e.g., buttons, icons, or the like on a touchscreen) on a display of one or more light sources 40, 41, 42 for a user to control. Alternatively, or in addition, the user interface 84 may have physical controls such as buttons, switches, or the like to control one or more of the light sources 40, 41, 42. When the user selects one or more of the selections (e.g., physical controls, touch-screen controls, or the like) for light sources 40, 41, 42, the user may control an ON operation, an OFF operation, a dimming operation, a brightness operation, a color change operation (e.g., where the output of the light color is changed, as discussed below), or the like. That is, the UI of controller 84 may be used to select one or more particular light sources 40, 41, 42. If the UI 84 is, for example, a touchscreen, the UI 84 may provide feedback as to which of the light sources 40, 41, 42 is selected to be controlled and/or the type of operating to be performed (e.g., an ON operation, an OFF operation, a dimming operation, a brightness operation, a color change operation, or the like) where the output of the light color is changed, as discussed below), or the like. Alternatively, if the UI 84 includes physical switches, the position and/or orientation of the switches may indicate which of the light sources 40, 41 42 is to be controlled, and/or the type of operation to be performed. Alternatively, or in addition, device 20 (e.g., a smartphone, a wearable computing device, a table computer, or the like) may control the selection and/or operation of the light sources 40, 41, 42.

When the location of the light sources 40, 41, 42 have been determined, the controller 73 may receive input via the UI 84 to define the order in which the light sources are illuminated, according to input received from the controller 73. That is, the user may override the location information that may be used to control the order in which the light sources 40, 41, 42 are controlled (e.g., turned ON or OFF, or the like) and may set an order in which the light sources 40, 41, 42 are controlled via the controller 73. For example, the controller 73 may be disposed within a first room of a house or building that is adjacent to a second room. The user may wish to set the order in which light sources that are controlled by the controller 73 for both the first and second rooms. That is, the user may set the controller 73 so that when input is received by the UI 84 of the controller 73, one or more light sources of the first room are controlled, and then one or more light sources of the second room are controlled before all of the light sources of the first room are controlled by the controller 73. Alternatively, or in addition, the smart-home environment (e.g., as described in connection with FIGS. 7-9, that includes the controller 73, device 20, and/or the remote system 74 shown in FIGS. 1-5) may collate data regarding the user's control of the light sources in the first and second rooms by the controller, and correspondingly adjust the order in which the light sources are controlled by the controller 73 to reflect the light source usage patterns by the user. The user may be informed by a message displayed on the UI 84 and/or via the device 20 when the order of control of the light sources 40, 41, 42, is changed by the controller 73 and/or remote system 74 according to the pattern of usage. By using the UI 84 and/or the device 20, the user may accept or decline the proposed change of control according to the pattern of usage.

In embodiments of the disclosed subject matter, one the light sources 40, 41, 42 may be a smart light source (e.g., a smart bulb), and the controller 73 may include a smart light source controller (e.g., the processor 81 and/or the switch 84). The smart light source controller may control the operation of the smart light source via the network 70 via the communications interface 83. In some embodiments, one of the light sources 40, 41, 42, may be a lamp or conventional light source, and another one of the light sources 40, 41, 42, may be a smart bulb (i.e., a smart light source) that may be controlled via the network 70 and/or a powerline network, so that the smart bulb may be switched ON or OFF via the lamp or conventional light source and/or a wall switch that includes a smart switch controller (e.g., as shown in FIGS. 4A-4E, and discussed in detail below).

In embodiments of the disclosed subject matter, the controller 73 may determine the type of the light source 40, 41, 42, and the UI 84 may provide the selectable options to control the identified light source 40, 41, 42. For example, when the controller 73 determines that the light source 40, 41, 42 is a LED light source (e.g., a light emitting diode light source, such as smart light source), the controller 73 may provide options, via the UI 84, for the user to select one or more color temperature options for the output spectrum of the LEDs of light source 40, 41, 42. That is, the controller 73 (e.g., via the processor 81 and/or the UI 84) may adjust the color temperature of the light output by the light source 40, 41, 42 to be warmer (i.e., have more red light content) or cooler (i.e., have more blue light content). The UI 84 may provide options to the user to select a color temperature, or may automatically adjust the output spectrum of the LEDs of the light source 40, 41, 42 by sensing (e.g., with sensors coupled to the light source 40, 41, 42, and/or included with the controller 73, and/or the sensor 60 shown in FIG. 7 and/or sensors 71, 72 shown in FIG. 8) the output spectrum of other lights sources in a predetermined area (e.g., the same room), and adjust the output spectrum of the LEDs to be similar to that of the other light sources. This may be determined by comparing the sensed output spectrums of other lights with the adjusted output spectrum of the LED light source using the sensors 40, 41, 42. The UI 84 would generally not show the option to adjust color temperature when the controller 73 determines that the light source 40, 41, 42 is, for example, a fluorescent light source because such light sources can only emit light of a fixed color.

Components within the controller 73 may transmit and receive information to and from one another via an internal bus or other mechanism as will be readily understood by one of skill in the art. One or more components may be implemented in a single physical arrangement, such as where multiple components are implemented on a single integrated circuit. Controllers, such as controller 73 as disclosed herein may include other components, and/or may not include all of the illustrative components shown.

Figure 3:
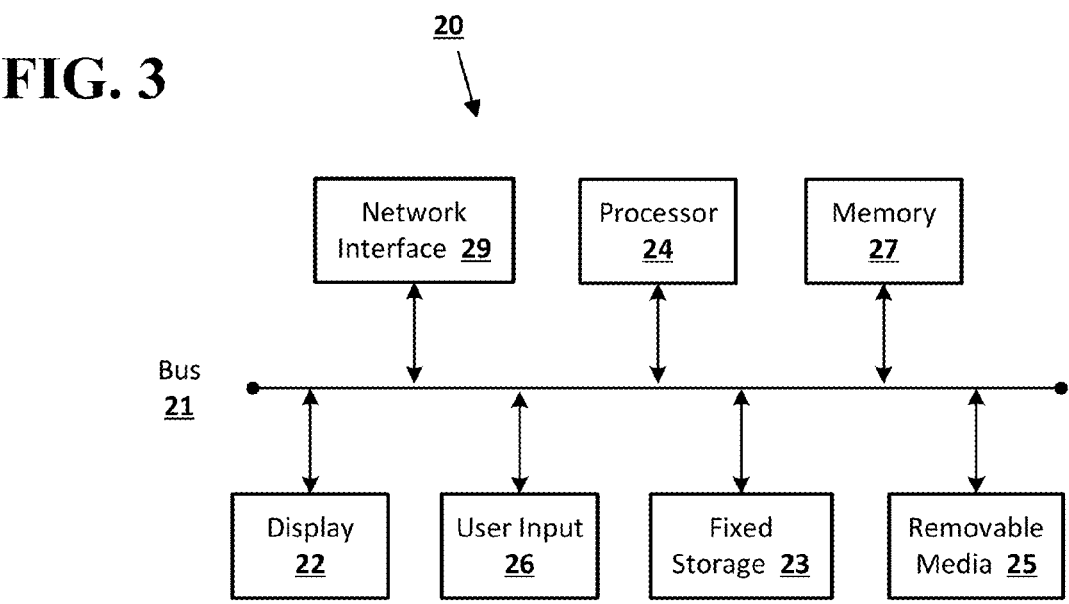
FIG. 3 shows a computing device according to an embodiment of the disclosed subject matter.

FIG. 3 shows a computing device 20 that may be communicatively couple to the light source system shown in FIGS. 1-2 according to an embodiment of the disclosed subject matter. For example, the device 20 may communicatively coupled to the network 70 shown in FIG. 1, and may be used to control light sources 40, 41, 42. Alternatively, or in addition, the device 20 may control the controller 73, the remote system 74 (e.g., to control and/or operate the light sources 40, 41, and 42), and/or the operation of the smart-home environment as discussed below in connection with FIGS. 7-9.

The device 20 shown in FIG. 3 may be used to implement a controller, a device including light sources as disclosed herein, or the like. Alternatively or in addition, the device 20 may be, for example, a desktop or laptop computer, or a mobile computing device such as a smart phone, smart watch, wearable computing device, fitness band, tablet, key FOB, RFID tag, or the like. The device 20 may include a bus 21 which interconnects major components of the device 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection (e.g., the network 70 shown in FIGS. 1, 8, and 9). The bus 21 allows data communication between the central processor 24 and one or more memory components 25, 27, which may include RAM, ROM, and other memory, as previously noted.

The fixed storage 23 of device 20 of FIG. 3 may be integral with the device 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the device to communicate with other computers via one or more local, wide-area, or other communication networks, as described in further detail herein.

Applications resident with the device 20 are generally stored on and accessed via a computer readable storage medium (e.g., fixed storage 23, removable media component 25, and/or memory 27). The applications resident with the device may be executed to control the light sources 40, 41, 42. For example, the light sources 40, 41, 42 may be controlled so as to illuminate or turn off the light sources 40, 41, 42 in a progressively larger radius and/or a progressively greater distance from the user and the device 20. The applications may also control the light sources 40, 41, 42 so as to control a dimming operation and/or an operation to increase brightness. The applications of device 20 may be used to select one or more of the devices 40, 41, 42 to be controlled by the device 20. The applications of the device 20 may be used to determine the position of the devices 40, 41, 42 relative to one another by communicating with the light sources 40, 41, 42 via the network 70, and/or via radio frequency or sonic signals. For example, the flight time of a sonic signal (e.g., a "ping" signal) may be determined by the device 20 in order to determine the distance of one or more of the light sources 40, 41, 42 from the device 20. The applications of the device 20 may display a user interface on the display 22 of the device to receive selections of the light sources 40, 41, 42 to identify and/or select the positions of the light sources 40, 41, 42 relative to one another, and to control the light sources 40, 41, 42. Alternatively, or in addition, to determine the distance of the light sources 40, 41, 42 from one another, the device 20 may determine the brightness, ON state, and/or OFF state of the light sources 40, 41, 42 by exchanging data with sensors 71 (e.g., light sensors) of network 70 shown in FIGS. 7-8 and discussed below.

In embodiments of the disclosed subject matter, the applications may receive input from a user to set the order in which the light sources 40, 41, 42 are controlled. The applications may do this automatically, or may receive input from the user to confirm or decline the change in control order. Alternatively, or in addition, sensors of the smart-home environment as discussed in connection with FIGS. 7-9 may monitor the movement of the device 20, and the applications of the device may change the order in which the light sources (e.g., light sources 40, 41, 42) are controlled according to the determined position of the device 20 relative to the light sources.

Figure 4A:
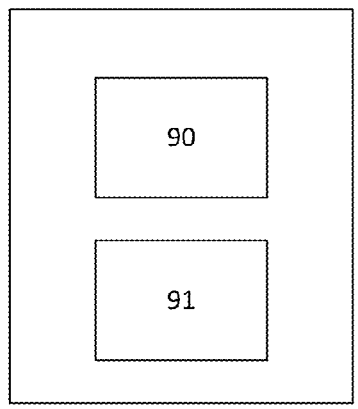
FIGS. 4A-4E show switches of the controller of FIGS. 1-2 according to embodiments of the disclosed subject matter.

FIGS. 4A-4E show different example switches 84 of controller 73 of FIGS. 1-2 according to embodiments of the disclosed subject matter. As discussed above, the switches 84 may be part of a user interface of the controller 73. FIG. 4A shows switch 84 that is a push-button switch that includes buttons 90 and 91. Selection of button 90 may turn one of light sources 40, 41, 42 ON, where the light source that is closest to the controller 73 is turned ON first (e.g., light source 40). As the button 90 is selected and/or pressed for a predetermined time (e.g., a first period of time that may be one second, two seconds, 4 seconds, etc.), the controller 73 controls the next closest light source to the controller 73 to turn ON (e.g., light source 41). When the button 90 continues to be selected and/or pressed (e.g., for at second period of time that is greater than the first period of time, such as longer than 2 seconds, 4 seconds, etc.), the controller 73 controls the next light source to be turned on (e.g., light source 42). FIG. 5 shows the progression of light sources 40, 41, 42 from the controller 73 that are turned ON, as the button 90 continues to be selected and/or pressed (e.g., for a time that is greater than a first period of time), according to their position relative to the controller 73.

Alternatively, the button 90 may receive a first selection to control the light source closest to controller 73 and a second selection of the button 90 may control the next closest light source to the controller 73, rather than the button being held for a predetermined time to control a light source, the next closest light source, and the like. That is, FIG. 5 shows the progression of light sources 40, 41, 42 from the controller 73 that are turned ON as the button 90 continues to receive selections (e.g., as the button is pressed multiple times).

When the button 91 shown in FIG. 4A is selected (e.g., the button 91 is selected once, or is selected for a first period of time, or the like), the lights sources 40, 41, 42 may be turned OFF in order of increasing distance from the controller 73. That is, as shown in FIG. 5, when the button 91 is pressed and/or selected, light source 40 may be turned OFF, and, as the selection of the button 91 continues (e.g., multiple selections and/or presses of button 91 are received, or the button 91 is pressed and/or selected for a time period greater than the first period of time), the sources 41 and 42 may be successively turned OFF at a progressively further distance from the user. Alternatively, the controller 73 may control the light sources 40, 41, 42 to be turned OFF according in decreasing distance order. That is, as shown in FIG. 5, the selection of the button 91 may control the controller 73 to successively turn OFF light source 42, the light source 41, and the light source 40, as the button 91 continues to be selected and/or pressed (e.g., selected multiple times, or for a time period greater than the first period of time, or the like).

Figure 4B:
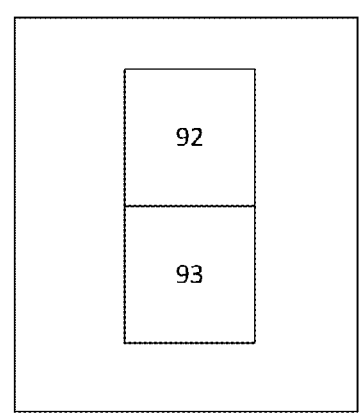
Figure 5:
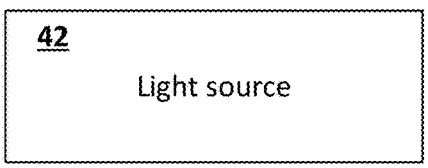
FIG. 5 shows another view of the light source system of FIG. 1 according to an embodiment of the disclosed subject matter.
Figure 5:
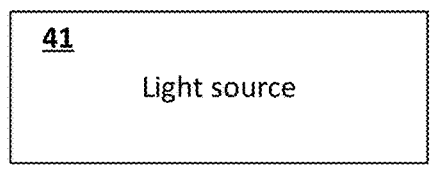
Figure 5:
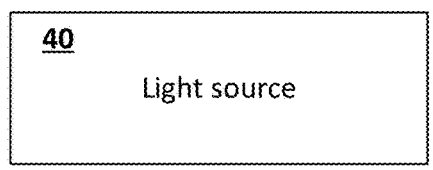
Figure 5:
Figure 5:
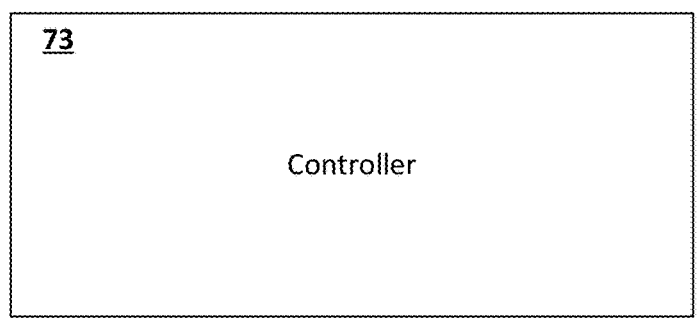

The switch 84 shown in FIG. 4B may be a rocker switch, having portion 92 that controls turning ON the light sources 40, 41, 42 in a similar manner to button 90 of the switch 84 described above in connection with FIG. 4A. Portion 93 of the rocker switch shown in FIG. 4B may control turning OFF the light sources 40, 41, 42 in a similar manner to button 91 of the switch 84 described above in connection with FIG. 4A.

Figure 4C:
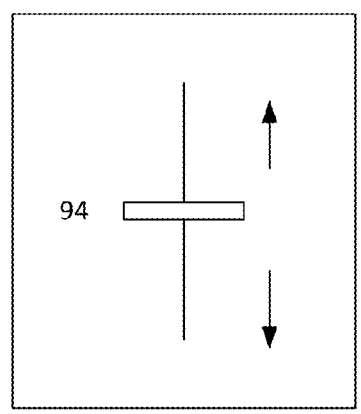

FIG. 4C shows the switch 84 as a slider switch, where slider 94 may be moved upward to control turning ON the light sources 40, 41, 42 in a similar manner to button 90 of the switch 84 described above in connection with FIG. 4A. The slider 94 may be moved downward to control turning OFF the light sources 40, 41, 42 in a similar manner to button 91 of the switch 84 described above in connection with FIG. 4A. Alternatively, or in addition, sliding the slider 94 upwards may increase the brightness of one or more of the light sources 40, 41, 42 (e.g., where the one or more light sources 40, 41, 42 may be selected by the controller 73, remote system 74, and/or device 20). Alternatively, or in addition, sliding the slider 94 downwards may perform a dimming operation on one or more of the light sources 40, 41, 42 (e.g., where the one or more light sources 40, 41, 42 may be selected by the controller 73, remote system 74, and/or device 20).

Figure 4D:
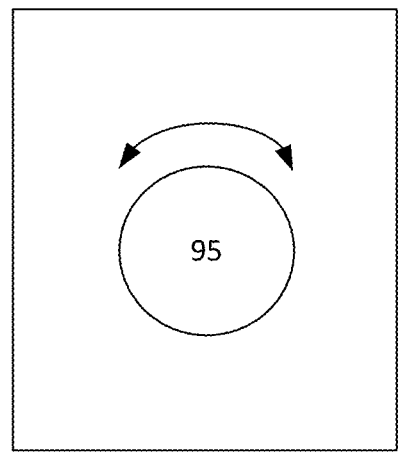
Figure 4E:
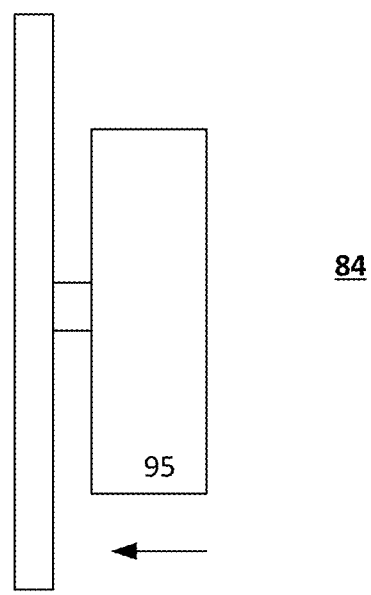

FIGS. 4D-4E show the switch 84 as a dial switch. The dial 95 may be rotated in a clockwise direction to control turning ON the light sources 40, 41, 42 in a similar manner to button 90 of the switch 84 described above in connection with FIG. 4A. Rather than pressing the button 90 multiple times or holding the button 90, the dial 95 may be continuously turned clockwise or turned multiple times (e.g., where the dial 95 includes a plurality of detents to delineate different inputs, where the turning may continue to successive detents) to successively turn ON light sources 40, 41, 42. Alternatively, or in addition, the dial 95 may be turned in a clockwise direction multiple times or held in the turned position to successively turn ON light sources 40, 41, 42 (e.g., the dial 95 may be turned and held for a period of time, where the longer the dial 95 is held in place, or where the dial may be turned to successive detents so that more light sources may be successively turned on). The dial 95 may be rotated in a counterclockwise direction to control turning OFF the light sources 40, 41, 42 in a similar manner to button 91 of the switch 84 described above in connection with FIG. 4A. Rather than holding the button 91, the dial 95 may be continuously turned counterclockwise to successively turn OFF light sources 40, 41, 42 (e.g., successively turned to detent points of the dial 95). Alternatively, or in addition, the dial may be turned in a counterclockwise direction and held in the turned position to successively turn OFF light sources 40, 41, 42 (e.g., the dial 95 may be turned and held for a period of time, where the longer the dial 95 is held in place, the more light sources may be successively turned off).

As shown in FIG. 4E, the dial 95 may be pressed towards a switch plate 96 to provide additional operational control of light sources 40, 41, 42. The pressing of the dial 95 towards the switch plate 96 while turning the dial 95 clockwise or counterclockwise may provide additional functions and/or operations. For example, when a user turns the dial 95 counterclockwise, the light source 40 may turn OFF. When the user continuously turns and/or holds the dial 95 in the counterclockwise direction or turns to a detent, the light sources 41 and 42 may successively turn OFF, according to their increasing distance from the user. However, when the user presses the dial 95 towards the switch plate 96 while turning the dial 95 counterclockwise, the switch 84 may turn OFF the light sources furthest from the user (e.g., light sources 41, 42), and they may turn OFF, in succession, according to their decreasing distance from the user (e.g., light source 42 turns OFF, then light source 41 turns OFF, and the like). That is, the user may control the light sources 40, 41, 42, so as to turn OFF all the light sources except the light source 40, which is where the user may be located.

That is, without pushing the dial 95 towards the switch plate 96, the user would have to turn off the light source 40 that is closest to the user, and then use the switch 84 to turn OFF all the other light sources in the room (e.g., light sources 41, 42), and then turn on the light source 40 again that is nearest to the user so as to still have a light source be on nearest to the user.

Figure 6:
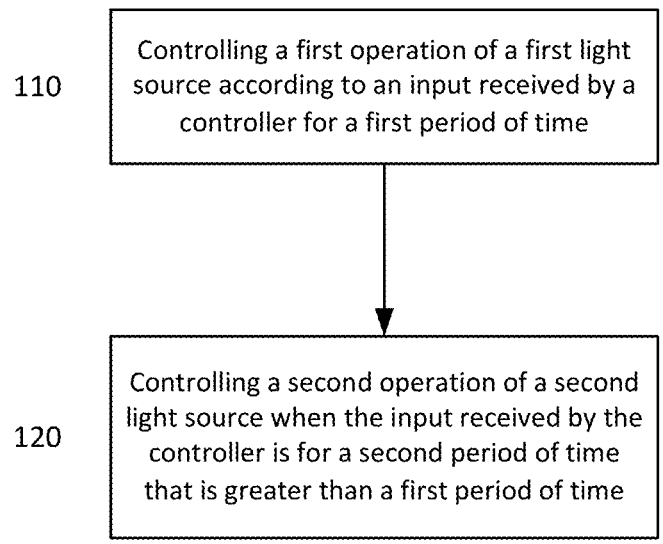
FIG. 6 shows a method of operating a light source system according to an embodiment of the disclosed subject matter.

FIG. 6 shows a method 100 of operating a light source system according to an embodiment of the disclosed subject matter. In operation 110, the controller 73 (e.g., as shown in FIGS. 1-2) may control a first operation (e.g., an ON operation, an OFF operation, a dimming operation, an operation to increase brightness, or the like) of a first light source (e.g., light source 40) according to an input received by the controller 73 for a first period of time. The controller 73 may control a second operation (e.g., an ON operation, an OFF operation, a dimming operation, an operation to increase brightness, or the like) of a second light source (e.g., light source 41) when the input received by the controller 73 is for at second period of time that is greater than the first period of time.

The controlling of the second operation of the method 100 may include controlling a smart light source of the second light source with a smart light source controller that is included in the controller. The method may include controlling, by a switch, the second light source according to the second operation, where the second light source is a smart light source, and the controller includes a smart light source controller.

The method 100 may include receiving, by a switch (e.g., switch 84 shown in FIGS. 2 and 4A-4E), the input to control the first light source (e.g., light source 40) and the second light source (e.g., light source 41) according to the first operation and the second operation, respectively. The switch 84 may receive input that includes at least one of a clockwise rotational movement, counterclockwise rotational movement, and a pressing selection.

The controller 73 may control the second operation of the second light source (e.g., light source 41), without controlling the first operation of the first light source (e.g., light source 40), when the switch 84 receives both the pressing selection and the clockwise or counterclockwise rotational movement.

The controller 73 may receive, via the switch 84, an input that controls the first operation of the first light source (e.g., light source 40) when the input is received for a first period of time (e.g., one second, two seconds, four seconds, or the like). The switch 84 may receive the input that controls the second operation of the second light source (e.g., light source 41) when the input is received for a second predetermined time (e.g., four seconds or the like) that is greater than the first period of time (e.g., one second, two seconds, or the like).

The operations of the method of the disclosed subject matter may include controlling, by the controller 73, a first operation of the first light source (e.g., light source 40) according to the input received by the controller 73, and successively controlling the second light source (e.g., light source 41) to according to the second operation and a third light source (e.g., light source 42) according to a third operation when the input received by the controller 73 and or switch 84 is for a third period of time that is greater than the second period of time (e.g., buttons and/or portions of the switch 84 continue to be pressed or/selected, and/or the dial of the switch is moved in a clockwise and/or counterclockwise direction).

The method may include successively controlling, by the controller 73, the second light source (e.g., light source 41) to according to the second operation and the third light source (e.g., light source 42) according to the third operation (e.g., an ON operation, an OFF operation, a dimming operation, an operation to increase brightness, or the like) according to the duration of the input received by the controller (e.g., one second, two seconds, four seconds, or the like).

The method of the disclosed subject matter may include transmitting, by the controller 73, request messages to the second light source (e.g., light source 41) and the third light source (e.g., light source 42) to determine their respective locations relative to the controller 73 and the first light source (e.g. light source 40). For example, the method may determine, by the controller 73, that the second light source (e.g., light source 41) is closer in distance to the first light source (e.g., light source 40) than the third light source (e.g., light source 42) according to messages received in response to the request messages.

The method of the disclosed subject matter may include receiving, by a user device (e.g., device 20), input to identify the position of the first light source (e.g., light source 40), the second light source (e.g., light source 41), and a third light source (e.g., light source 42) in an area (e.g., a room, a home, a building, or the like). The user device 20 may control the first operation of the first light source (e.g., light source 40) and control the second operation of the second light source (e.g., light source 41) and a third operation of the third light source (e.g., light source 42) according to an order that corresponds to the identified position (e.g., the identified positions of the light sources 40, 41, 42).

The method may include transmitting, by the user device 20, commands to control a first operation to control the first light source (e.g., the light source 40) and the second operation to control the second light source (e.g., light source 41).

Alternatively, rather than the amount of time for the inputs to control the operations of the first and second light sources, the operations and light sources may be controlled according to a different number inputs (e.g., the number of times a button or switch is pressed, the number of times a dial switch is turned, or the like). That is, a method of the embodiments disclosed herein may include controlling, by a controller, a first operation of a first light source according to a first input received by the controller, and controlling, by the controller, a second operation of a second light source according to a second input. A first input to control a first light source may be a first press of a button or switch, or a first turn of a dial switch, and the second input may be a second press of the same button or switch, or a second turn of the dial switch, to control the second light source.

The light source system and its operation shown and described in connection with FIGS. 1-5 may be included in a smart-home environment having one or more sensors, as shown in FIGS. 7-9 and discussed below.

The smart-home environment may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control light sources in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

A sensor may include hardware in addition to the specific physical sensor that obtains information about the environment. FIG. 7 shows an example sensor as disclosed herein. The sensor 60 may include an environmental sensor 61, such as a light sensor, temperature sensor, smoke sensor, carbon monoxide sensor, motion sensor, accelerometer, proximity sensor, passive infrared (PIR) sensor, magnetic field sensor, radio frequency (RF) sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a liquid crystal display (LCD), light-emitting diode (LED) display, or limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

In some configurations, two or more sensors may generate data that can be used by a processor of a system to generate a response and/or infer a state of the environment. For example, an ambient light sensor in a room may determine that the room is dark (e.g., less than 60 lux). A microphone in the room may detect a sound above a set threshold, such as 60 dB. The system processor may determine, based on the data generated by both sensors that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

Data generated by one or more sensors may indicate patterns in the behavior of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light source as the occupant of the room in which the sensor is located enters/leaves the room. At other times, the light sensor data may indicate that no light sources are turned on/off in the room. The system, therefore, may learn that occupants patterns of turning on and off light sources, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific light sources may be verified and/or further refined based upon states of, or data gathered by, smart switches, outlets, lamps, light sources, controllers, devices, and the like.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

FIG. 8 shows an example of a sensor network as disclosed herein, which may be implemented over any suitable wired and/or wireless communication networks (e.g., network 70). One or more sensors 71, 72 may communicate via a local network 70, such as a Thread network, Wi-Fi, or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 8 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network in FIG. 8 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 8.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 8, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 8, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 8 may include one or more intelligent, multi-sensing, network-connected wall switches (e.g., "smart wall switches"), one or more intelligent, multi-sensing, network-connected wall plug interfaces (e.g., "smart wall plugs"). The smart wall switches may include the switches shown in FIGS. 4A-4E and discussed above, the controller 73 shown in FIGS. 1-2 and discussed above, and/or the device 20 shown in FIG. 3 and discussed above. The switch 84 shown in FIGS. 4A-4E, the controller 73 shown in FIGS. 1, 2 and 5, and/or the device 20 shown in FIGS. 2-3 may communicate with and/or control the light sources 40, 41, 42.

The smart wall switches and/or smart wall plugs may be or include one or more of the sensors 71, 72 shown in FIG. 8. A smart wall switch may detect ambient lighting conditions, and control a power and/or dim state of one or more lights. For example, a sensor such as sensors 71, 72, may detect ambient lighting conditions, and the controller 73, the switch 84, and/or the device 20 may control the power to one or more lights (e.g., light sources 40, 41, 42 shown in FIGS. 1 and 5) in the smart-home environment. Smart wall switches (e.g., the switch 84 shown in FIGS. 4A-4E, and/or controller 73 shown in FIGS. 1, 2, 5 and 8, and/or device 20 shown in FIGS. 1 and 3) may also control a power state or speed of a fan, such as a ceiling fan. For example, sensors 72, 72 may detect the power and/or speed of a fan, and the controller 73 may adjust the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 8. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 8 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 8) can be communicatively coupled to each other via the network 70, and to the controller 73 and/or remote system 74 to provide security, safety, and/or comfort for the smart home environment.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, smart watch, wearable computing device, fitness band, a tablet, a key FOB, or the like). For example, using the device 20 shown in FIGS. 1 and 3, and/or the controller 73 as described above, a user can communicate with one or more of the network-connected smart devices. A webpage or application can be configured to receive communications from the user and control the one or more of the network-connected smart devices based on the communications and/or to present information about the device's operation to the user. For example, the user can view, arm or disarm the security system and/or control the light sources (e.g., light sources 40, 41, 42) of the home.

One or more users can control one or more of the network-connected smart devices in the smart-home environment using a network-connected computer or portable electronic device. In some examples, some or all of the users (e.g., individuals who live in the home) can register their mobile device, wearable computing device, and/or key FOB s with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices (e.g., light sources 40, 41, 42) and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. For example, the smart-home environment may learn which light sources the user has in an ON state or OFF state at particular times of the day, and may control the light sources 40, 41, 42 to operate according to this learned schedule. Various types of notices and other information may be provided to users via messages sent to one or more user electronic devices. For example, the messages can be sent via email, short message service (SMS), multimedia messaging service (MIMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor light source system (not shown, but may be similar to light source system shown in FIGS. 1-5 and discussed above) that communicates information through the communication network 70 or directly to a central server or cloud-computing system (e.g., controller 73 and/or remote system 74) regarding detected movement and/or presence of people, animals, and any other objects and receives back commands for controlling the light sources accordingly.

The controller 73 and/or remote system 74 can control the outdoor light source system based on information received from the other network-connected smart devices in the smart-home environment. For example, in the event that any of the network-connected smart devices, such as smart wall plugs located outdoors, detect movement at night time, the controller 73 and/or remote system 74 can activate the outdoor light source system and/or other lights in the smart-home environment.

As shown in FIG. 9, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 8 may provide information to the remote system 74. The systems 81, 82 shown in FIG. 9 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. In embodiments of the disclosed subject matter, the user may have control over how information is collected about the user and used by a system as disclosed herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system comprising:
a first light source included in a first device that is disposed at a first location in a room;
a second light source included in a second device that is disposed at a distance from the first light source at a second location in the room; and
a controller, including a switch, communicatively coupled to the first light source and the second light source, the controller to control a first operation of the first light source according to a first input received by the switch, and to control a second operation of the second light source when a second input is received by the switch, wherein the controller controls the first and second operations of the respective first light source and second light source sequentially based on respective positions of the first light source and the second light source to the switch.

2. The system of claim 1, wherein the switch has a plurality of positions, and the controller controls the first operation of the first light source according to the first input received by the switch that is in a first position of the plurality of positions, and the controller controls the second operation of the second light source according to the second input received by the switch that is in a second position of the plurality of positions.

3. The system of claim 1, wherein the switch includes a dial, and the first input that controls the first operation of the first light source is a first rotational input of the dial, and the second input that controls the second operation of the second light source is a second rotational input of the dial.

4. The system of claim 3, wherein the first rotational input and the second rotational input are in the same rotational direction, and that a rotational distance of the second rotational input is greater than a rotational distance of the first rotational input.

5. The system of claim 3, wherein the first rotational input corresponds to a first detent of the dial, and the second rotational input corresponds to a second detent of the dial.

6. The system of claim 3, wherein when the dial receives both a pressing selection and a clockwise or counterclockwise rotational movement, the controller controls the second operation of the second light source, without controlling the first operation of the first light source.

7. The system of claim 1, and the first input that controls the first operation of the first light source is a first press input of the switch, and the second input that controls the second operation of the second light source is a second press input of the switch.

8. The system of claim 1, wherein the switch includes a slider, and the first input that controls the first operation of the first light source is a first directional input of the slider, and the second input that controls the second operation of the second light source is a second directional input of the slider.

9. The system of claim 8, wherein the first directional input and the second directional input are in the same direction, and the second directional input is a greater distance than the first directional input.

10. The system of claim 1, wherein the first input that controls the first operation of the first light source is a first selection the switch, and the second input that controls the second operation of the second light source is a second selection of the switch.

11. The system of claim 1, wherein the second light source is a smart light source, and the controller includes a smart light source controller, and
wherein the switch and the smart light source controller control the second operation of the smart light source.

12. The system of claim 1, wherein the first operation and the second operation are selected from the group consisting of: an ON operation, an OFF operation, a dimming operation, and an operation to increase brightness.

13. The system of claim 1, further comprising:
a third light source communicatively coupled to the controller,
wherein the controller controls the third light source according to a third operation when a third input is received by the switch.

14. The system of claim 13, wherein the controller successively controls the first light source, the second light source, and the third light source based on the first input, the second input, and the third input, respectively.

15. The system of claim 13, wherein the controller transmits request messages to the second light source and the third light source to determine their respective locations.

16. The system of claim 15, wherein the controller determines that the second light source is closer in distance to the first light source than the third light source is to the first light source according to messages received in response to the request messages.

17. The system of claim 13, further comprising:
a user device to receive input to identify the position of the first light source, the second light source, and the third light source in an area.

18. The system of claim 17, wherein the user device controls at least one from the group consisting of: the first light source, the second light source, and the third light source according to an order that corresponds to the identified position.

19. The system of claim 1, further comprising:
a user device communicatively coupled to the controller, the user device to transmit commands from the group consisting of: the first operation to control the first light source and the second operation to control the second light source.

20. The system of claim 1, wherein the controller transmits request messages to the first light source and the second light source to determine their respective locations.

21. The system of claim 1, wherein the controller controls the order in which the first light source and the second light source are sequentially controlled to perform the first operation and the second operation.

22. A method comprising:
controlling a first light source included in a first device that is disposed in a first location in a room with a controller;
controlling, with the controller, a second light source included in a second device that is disposed at a distance from the first light source at a second location in the room; and
controlling, with the controller, a first operation of the first light source according to a first input received by a switch that is part of the controller, and controlling a second operation of the second light source when a second input is received by the switch, wherein the first and second operations of the respective first light source and second light source are controlled sequentially based on respective positions of the first light source and the second light source to the switch.

23. The method of claim 22, wherein the controlling of the first operation of the first light source is according to the first input received by the switch that is in a first position of a plurality of positions, and wherein the controlling the second operation of the second light source is according to the second input received by the switch that is in a second position of the plurality of positions.

24. The method of claim 22, further comprising:
receiving, via a dial that is part of the switch, a first rotational input that corresponds to the first input;
receiving, via the dial, a second rotational input that corresponds to the second input; and
controlling the first operation of the first light source based on the first rotational input of a dial, and controlling the second operation of the second light source based on the second rotational input of the dial.

25. The method of claim 24, wherein the first rotational input and the second rotational input are in in the same rotational direction, and that the rotational distance of the second rotational input is greater than the rotational distance of the first rotational input.

26. The method of claim 24, wherein the first rotational input corresponds to a first detent of the dial, and the second rotational input corresponds to a second detent of the dial.

27. The method of claim 24, further comprising:
receiving, with the dial, both a pressing selection and a clockwise or counterclockwise rotational movement; and
controlling, via the controller, the second operation of the second light source without controlling the first operation of the first light source.

28. The method of claim 22, further comprising:
receiving a first press input of the switch as the first input that controls the first operation of the first light source; and
receiving a second press input of the switch as the second input that controls the second operation of the second light source.

29. The method of claim 22, further comprising:
receiving a first directional input from a slider that is part of the switch that is the first input that controls the first operation of the first light source, and
receiving a second directional input from the second input that controls the second operation of the second light source is a second directional input of the slider.

30. The method of claim 29, wherein the first directional input and the second directional input are in the same direction, and the second directional input is a greater distance than the first directional input.

31. The method of claim 22, further comprising:
receiving a first selection of the switch as the first input that controls the first operation of the first light source; and
receiving a second selection of the switch as the second input that controls the second operation of the second light source.

32. The method of claim 22, wherein the controlling the second operation comprises controlling the second light source as a smart light source with the controller that includes a smart light source controller.

33. The method of claim 22, wherein the first operation and the second operation are selected from the group consisting of: an ON operation, an OFF operation, a dimming operation, and an operation to increase brightness.

34. The method of claim 22, further comprising:
controlling, with the controller, a third light source according to a third operation when a third input is received by the switch.

35. The method of claim 34, further comprising:
successively controlling, with the controller, the first light source, the second light source, and the third light source based on the first input, the second input, and the third input, respectively.

36. The method of claim 34, further comprising:
transmitting, with the controller, request messages to the second light source and the third light source to determine their respective locations.

37. The method of claim 36, further comprising:
determining, with the controller, that the second light source is closer in distance to the first light source than the third light source is to the first light source according to messages received in response to the request messages.

38. The method of claim 34, further comprising:
receiving, at a user device, input to identify the position of the first light source, the second light source, and the third light source in an area.

39. The method of claim 38, further comprising:
controlling, with the user device, at least one from the group consisting of: the first light source, the second light source, and the third light source according to an order that corresponds to the identified position.

40. The method of claim 22, further comprising:
transmitting, via a user device communicatively coupled to the controller, commands from the group consisting of: the first operation to control the first light source and the second operation to control the second light source.

* * * * *